United States Patent
Quast et al.

(10) Patent No.: US 11,299,072 B2
(45) Date of Patent: Apr. 12, 2022

(54) SEAT RAIL PAIR FOR A VEHICLE SEAT

(71) Applicant: Adient Luxembourg Holding S.á r.l., Luxembourg (LU)

(72) Inventors: Ingo Quast, Duesseldorf (DE); Erik Sprenger, Wermelskirchen (DE); Udo Goettel, Wolfstein (DE); Turgay Turan, Kerpen (DE); Michael Zacharias, Leichlingen (DE); Joachim Flick, Hueckeswagen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 16/334,130

(22) PCT Filed: Sep. 21, 2017

(86) PCT No.: PCT/EP2017/073946
§ 371 (c)(1),
(2) Date: Mar. 18, 2019

(87) PCT Pub. No.: WO2018/055055
PCT Pub. Date: Mar. 29, 2018

(65) Prior Publication Data
US 2019/0375314 A1     Dec. 12, 2019

(30) Foreign Application Priority Data

Sep. 21, 2016  (DE) ............... 10 2016 218 132.7
Dec. 21, 2016  (DE) ............... 10 2016 225 822.2

(51) Int. Cl.
*B60N 2/07*      (2006.01)
*B60N 2/08*      (2006.01)

(52) U.S. Cl.
CPC ......... *B60N 2/0715* (2013.01); *B60N 2/0705* (2013.01); *B60N 2/0727* (2013.01); *B60N 2/0818* (2013.01); *B60N 2/0875* (2013.01)

(58) Field of Classification Search
CPC .. B60N 2/0705; B60N 2/0715; B60N 2/0727; B60N 2/0722; B60N 2/073;
(Continued)

(56) References Cited

U.S. PATENT DOCUMENTS 6,648,292 B2 * 11/2003 Flick ................... B60N 2/0705
                                                   248/430
6,843,532 B2 *  1/2005 Borbe .................. B60N 2/0825
                                                   297/216.16
(Continued)

FOREIGN PATENT DOCUMENTS

DE    100 39 510 A1    2/2002
DE    100 39 511 A1    2/2002
(Continued)

OTHER PUBLICATIONS

EPO Machine Translation of Angermann et al. (DE 100 39 511 A1). (Year: 2019).*

*Primary Examiner* — Muhammad Ijaz
*Assistant Examiner* — Guang H Guan
(74) *Attorney, Agent, or Firm* — Marshall & Melhorn, LLC

(57) ABSTRACT

A seat rail pair for a vehicle seat is disclosed. The seat rail pair may have a lower rail and an upper rail. The upper rail may be moved relative to the lower rail via mutually engaged profiles. The lower rail may have a substantially C-shaped profile and the upper rail may have a substantially U-shaped profile. Roller members may be arranged between the upper rail and the lower rail to facilitate relative movement.

19 Claims, 3 Drawing Sheets

(58) Field of Classification Search
CPC .. B60N 2/0812; B60N 2/0818; B60N 2/0831; B60N 2/0862; B60N 2/0875
USPC .................................. 248/424, 429, 430
See application file for complete search history.

(56) References Cited

U.S. PATENT DOCUMENTS

| | | | | |
|---|---|---|---|---|
| 7,503,614 B2* | 3/2009 | Yamada | ............... | B60N 2/0705 248/429 |
| 7,511,479 B2* | 3/2009 | Schuler | ............... | G01D 5/34746 324/207.2 |
| 7,815,159 B2* | 10/2010 | Moriyama | ........... | B60N 2/0727 248/430 |
| 8,033,520 B2* | 10/2011 | Fujieda | ................ | B60N 2/0727 296/65.14 |
| 8,297,583 B2* | 10/2012 | Kimura | ................ | B60N 2/0705 248/429 |
| 8,398,045 B2* | 3/2013 | Kimura | ................ | F16C 29/048 296/65.01 |
| 8,814,123 B2* | 8/2014 | Suzuki | ................ | B60N 2/0705 248/429 |
| 9,132,750 B2* | 9/2015 | Jahner | ...................... | B60N 2/08 |
| 9,573,491 B2* | 2/2017 | Schumann | ........... | B60N 2/0705 |
| 9,783,083 B2* | 10/2017 | Sato | ...................... | B60N 2/0725 |
| 10,471,853 B2* | 11/2019 | Taniguchi | ............... | B60N 2/085 |
| 10,518,666 B2* | 12/2019 | Hagan | .................. | B60N 2/0722 |
| 10,596,924 B2* | 3/2020 | Sprenger | ................ | B60N 2/075 |
| 10,688,895 B2* | 6/2020 | Emrich | ................ | B60N 2/0818 |
| 10,703,226 B2* | 7/2020 | Sprenger | ................ | B60N 2/085 |
| 10,759,309 B2* | 9/2020 | Flick | ................... | B60N 2/0875 |
| 10,940,775 B2* | 3/2021 | Tamaki | ................ | B60N 2/085 |
| 11,052,788 B2* | 7/2021 | Sprenger | ............. | B60N 2/0232 |
| 11,065,986 B2* | 7/2021 | Emrich | .................... | B60N 2/43 |
| 11,230,208 B2* | 1/2022 | Flick | ........................ | B60N 2/08 |
| 2010/0320353 A1 | 12/2010 | Kojima et al. | | |
| 2012/0006963 A1* | 1/2012 | Yoshida | ............... | B60N 2/0715 248/429 |
| 2014/0231610 A1 | 8/2014 | Hoshihara et al. | | |
| 2016/0101712 A1* | 4/2016 | Hagan | .................. | B60N 2/0722 248/429 |
| 2018/0222352 A1* | 8/2018 | Flick | .................... | B60N 2/0818 |
| 2019/0168639 A1* | 6/2019 | Sprenger | ............. | B60N 2/0705 |
| 2019/0375314 A1* | 12/2019 | Quast | .................. | B60N 2/0727 |
| 2019/0389332 A1* | 12/2019 | Flick | .................... | B60N 2/0727 |
| 2021/0268939 A1* | 9/2021 | Hao | ...................... | B60N 2/0722 |

FOREIGN PATENT DOCUMENTS

| | | | |
|---|---|---|---|
| DE | 10 2010 021 538 A1 | 1/2011 | |
| DE | 10 2011 115 948 B3 | 1/2013 | |
| DE | 10 2014 213 104 A1 | 10/2015 | |
| DE | 10 2014 219 865 A1 | 3/2016 | |
| DE | 10 2014 217331 A1 | 3/2016 | |
| DE | 10 2016 208 469 A1 | 12/2016 | |
| EP | 0 856 429 A1 | 8/1998 | |
| FR | 2 847 530 A1 | 5/2004 | |
| FR | 2996182 A1 * | 4/2014 | ........... B60N 2/0727 |
| JP | 2005 67218 A | 3/2005 | |
| WO | WO-2011154080 A1 * | 12/2011 | ........... B60N 2/0875 |

* cited by examiner

SEAT RAIL PAIR FOR A VEHICLE SEAT

CROSS REFERENCE TO RELATED APPLICATIONS

This application is a United States National Phase Application of International Application PCT/EP2017/073946 filed Sep. 21, 2017, and claims the benefit of priority under 35 U.S.C. § 119 of German Applications 10 2016 218 132.7, filed Sep. 21, 2016 and 10 2016 225 822.2, filed Dec. 21, 2016 the entire contents of which are incorporated herein by reference.

TECHNICAL FIELD

The invention relates to a seat rail pair for a vehicle seat, in particular for a motor vehicle seat, having a lower rail, an upper rail which is displaceably guided relative to the lower rail in the longitudinal direction, which rails mutually engage behind each other with the profiles thereof, wherein the lower rail has a substantially C-shaped profile with portions which are bent downward at the ends, and the upper rail has a substantially U-shaped profile with end portions which are bent upward, wherein roller members are arranged in two lower roller member raceways and two upper roller member raceways between the lower rail and the upper rail.

TECHNICAL BACKGROUND

JP 2005-67218 A discloses a generic vehicle seat with a longitudinal displacement mechanism which comprises an upper rail and a lower rail. In order to limit the displacement path of the upper rail relative to the lower rail, end stops are provided.

SUMMARY

An object of the invention is to improve a seat rail pair of the type mentioned in the introduction, in particular a seat rail pair having a defined positioning of a roller member cage and a higher level of loadability in the event of a crash.

This object is achieved according to the invention with a seat rail pair for a vehicle seat, in particular for a motor vehicle seat, having a lower rail, an upper rail which is displaceably guided relative to the lower rail in the longitudinal direction, which rails mutually engage behind each other with the profiles thereof, wherein the lower rail has an in particular upwardly open, substantially C-shaped profile with portions which are bent downward at the ends, wherein the upper rail has an in particular downwardly open, substantially U-shaped profile with end portions which are bent upward, wherein roller members are arranged in two lower roller member raceways and two upper roller member raceways between the lower rail and the upper rail, wherein a portion of the end portions of the upper rail, which portion contacts the roller members which are arranged in the lower roller member raceways, has a planar support face.

As a result of the fact that a portion of the end portions of the upper rail, which portion contacts the roller members which are arranged in the lower roller member raceways, has a planar support face, a high level of strength and a tolerance compensation of the seat rail pair can be achieved. In particular, the stability of the seat rail pair in the transverse direction and vertical direction and a torsional rigidity can be increased.

The lower rail may have a substantially planar base which when viewed in the transverse direction is adjoined at both sides by upwardly bent outer profile portions. The upwardly bent profile portions may merge at the ends thereof opposite the base into the downwardly bent portions. The upwardly bent end portions of the upper rail can be guided in the external profile portions of the lower rail.

The roller member raceways may be arranged in the outer profile portions. The outer profile portions may be arranged so as to be raised in the region of the lower roller member raceways relative to the base of the lower rail with a step being formed in a vertical direction.

The respective support face may contact the respective roller member in a half closer to an axis of symmetry of the seat rail pair and may be constructed to be extended outward. The support face may be orientated tangentially with respect to a notional circular path about a center point of an outer bend of the U-shaped profile of the upper rail. The support face may be positioned at an angle in the range from 15° to 25°, in particular at an angle of 20°, with respect to the base.

The displaceability of the upper rail relative to the lower rail can be limited by means of a cooperation of an end stop which is arranged in extension of the downwardly bent portions of the lower rail with a stop element which is arranged in a transition region between the U-shaped profile and the respective upwardly bent end portion.

The roller members may be retained in an upper or a lower retention portion of a common roller member cage.

Before an embodiment of the invention is described in greater detail below with reference to drawings, it should first be noted that the invention is not limited to the components described or the method steps described. Furthermore, the terminology used also does not represent any limitation, but instead is merely of an exemplary nature. Whenever the singular is used below in the description and the claims, the plural is also included unless the context explicitly excludes this.

The invention is explained in greater detail below with reference to an advantageous embodiment illustrated in the Figures. However, the invention is not limited to this embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF PREFERRED EMBODIMENTS

Figure 1:
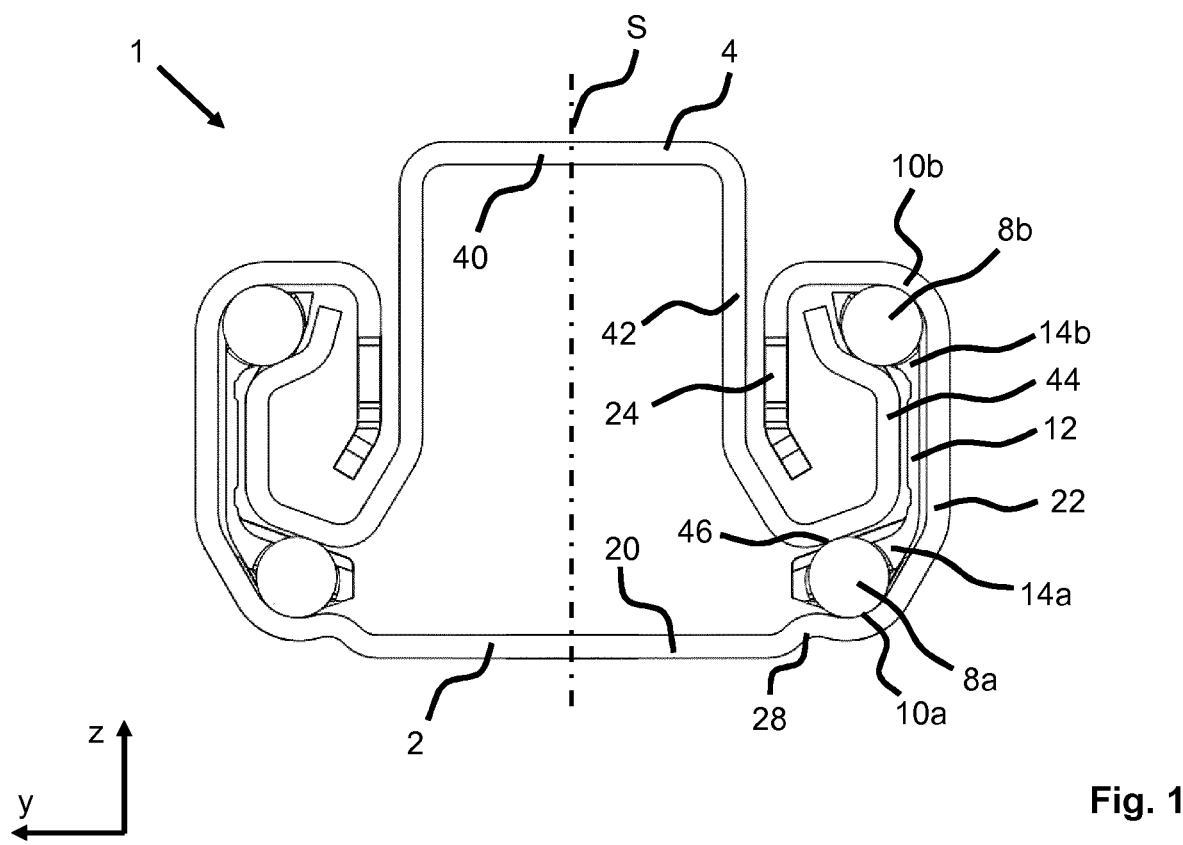
FIG. 1 is a cross-sectional view of a seat rail pair according to the invention.

Referring to the drawings, a generic seat rail pair 1 illustrated schematically in FIG. 1 is described below using three spatial directions which extend perpendicularly to each other. A longitudinal direction extends in the case of a seat rail pair 1 which is fitted in a vehicle substantially horizontally and preferably parallel with a longitudinal vehicle direction which corresponds to the usual travel direction of the vehicle. A transverse direction y which extends perpendicularly to the longitudinal direction is also orientated horizontally in the vehicle and extends parallel with a transverse vehicle direction. A vertical direction z extends perpendicularly to the longitudinal direction and perpendicularly to the transverse direction y. With a seat rail pair 1 which is installed in the vehicle, the vertical direction z extends parallel with the vertical vehicle axis.

The position and direction indications used, such as, for example, front, rear, top and bottom, refer to a viewing direction of a passenger sitting in a vehicle seat in a normal sitting position, wherein the vehicle seat is installed in the vehicle, is in a position for use which is suitable for transporting persons with an upright backrest and is orientated in the usual manner in the travel direction.

FIG. 1 is a cross-section of a seat rail pair 1 according to the invention for a vehicle seat, in particular for a motor vehicle seat. The additional FIGS. 2 to 6 also show the seat rail pair 1 as a complete or partial cross-section. The description of the seat rail pair 1 from FIG. 1 applies to the following FIGS. 2 to 6 unless an explicitly different description of them is given.

The seat rail pair 1 has a lower rail 2 and an upper rail 4 which is displaceably guided relative to the lower rail 2 in the longitudinal direction. The lower rail 2 and the upper rail 4 mutually engage behind each other with the profiles thereof. The lower rail 2 has an upwardly open, substantially C-shaped profile with portions 24 which are bent downward at the ends. The lower rail 2 has a substantially planar base 20 which is adjoined at both sides when viewed parallel with the transverse direction y by upwardly bent external profile portions 22. The upwardly bent profile portions 22 merge at the ends thereof opposite the base 20 into the downwardly bent portions 24.

The upper rail 4 has a downwardly open substantially U-shaped profile with upwardly bent end portions 44. The upper rail 4 has a substantially planar base profile 40 which is adjoined at both sides when viewed parallel with the transverse direction y by downwardly bent members 42. The downwardly bent members 42 merge at the ends thereof opposite the base profile 40 into the upwardly bent end portions 44.

The upwardly bent end portions 44 of the upper rail 4 are guided in the outer profile portions 22 of the lower rail 2. In two lower roller member raceways 10a and two upper roller member raceways 10b, there are arranged in each case at least two roller members 8a, 8b between the lower rail 2 and the upper rail 4. The roller member raceways 10a, 10b are arranged in the outer profile portions 22. The roller members 8a, 8b are retained in an upper retention portion 14b and a lower retention portion 14a of a common roller member cage 12. Each roller member cage 12 retains at least four roller members 8a, 8b.

A portion of the end portions 44 of the upper rail 4, which portion contacts the roller members 8a which are arranged in the lower roller member raceways 10a, has a planar support face 46.

The upper rail 4 and the lower rail 2 are in this instance constructed symmetrically with respect to an axis of symmetry S. The upper rail 4 has in this instance twelve bends, wherein the bends have a maximum bending angle of 90°. The lower rail 2 has in this instance fourteen bends, wherein the bends have a maximum bending angle of 90°. Furthermore, a diameter of the roller members 8a, 8b in the range from 4 mm to 6 mm, in particular of precisely 5 mm, has been found to be advantageous. The bends of the lower rail 2 in the region of the roller member raceways 10a, 10b are adapted to the diameters of the roller members 8a, 8b which are in use.

A height of the upper rail 4, in particular a height of the members 42, may vary. The roller members 8a, 8b which are constructed in this instance as balls, can, according to an embodiment which is not illustrated, be replaced by sliding elements, in particular of plastics material.

Figure 2:
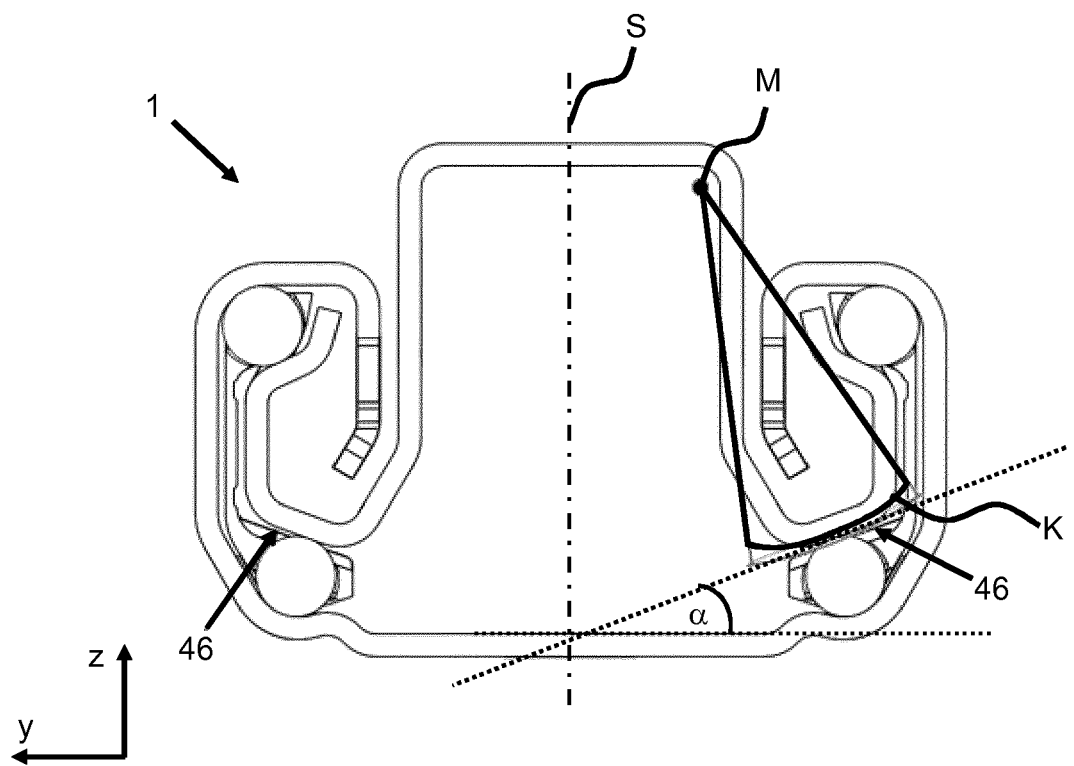
FIG. 2 is another view of the cross-section of the seat rail pair from FIG. 1.

FIG. 2 shows that the support face 46 is orientated tangentially with respect to a notional circular path K about a center point M of an outer bend of the U-shaped profile of the upper rail 4. The support face 46 may be positioned at an angle α in the range from 15° to 25° with respect to the base 20 of the lower rail 2. In this instance, the support face 46 is positioned at an angle α of 20° with respect to the base 20 of the lower rail 2. The center point M is the center point of the bending radius between the base profile 40 and the respective member 42.

This relatively flat angle α brings about an improved stability of the seat rail pair 1 parallel with the vertical direction z. Furthermore, different deflections of the upper rail 4 and the lower rail 2, for example, as a result of production tolerances, are prevented from leading to a change of the dimensions in a vertical direction z. The upper roller member raceways 10b of the upper rail 4 have with respect to the upper roller members 8b an abutment face which is positioned at an angle of approximately 25° with respect to the horizontal.

Furthermore, the two support faces 46 contact the respective roller members 8a in a half of the support faces 46 closer to an axis of symmetry S of the seat rail pair 1 and are constructed to be extended outward. It can thereby be ensured that the upper rail 4 even in the event of torsion about a longitudinal axis of the seat rail pair 1 does not slide off from the roller members 8a into the lower roller member raceways 10a.

Figure 3:
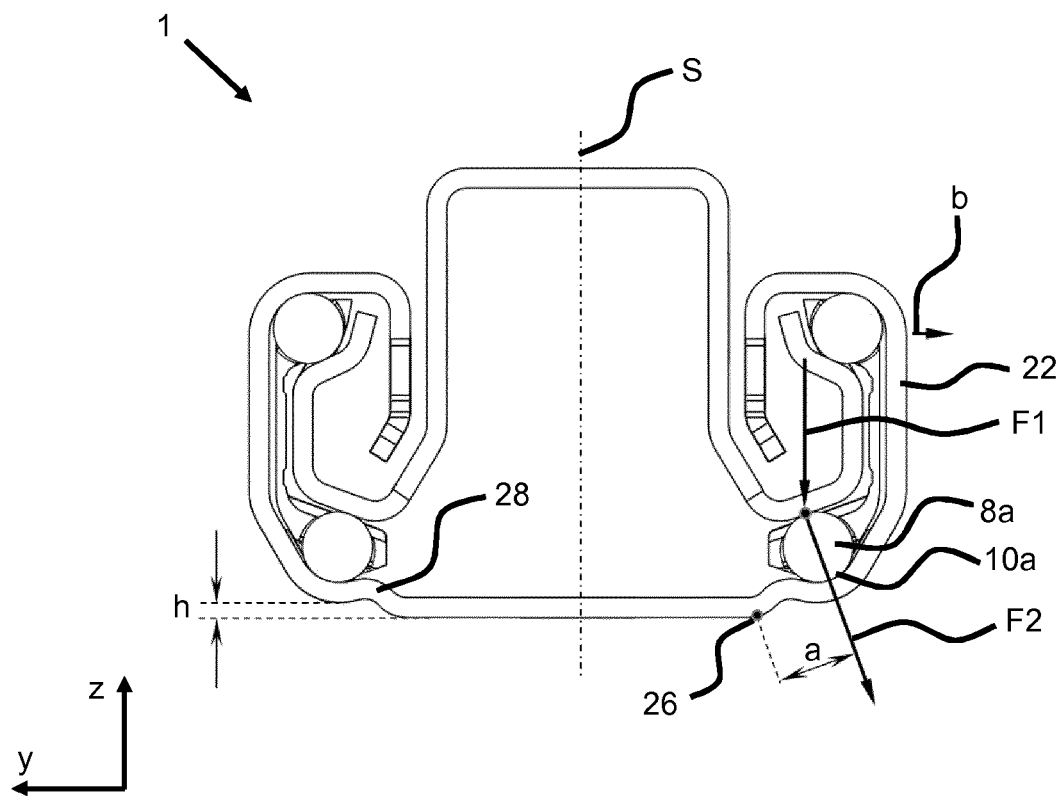
FIG. 3 is another view of the cross-section of the seat rail pair from FIG. 1.

FIG. 3 shows that the outer profile portions 22 in the region of the lower roller member raceways 10a are arranged so as to be raised relative to the base 20 of the lower rail 2 with a step 28 being formed in a vertical direction z. The lower roller member raceway 10a is raised by a predetermined amount in the vertical direction z in order in the event of a flexion of the rail about the transverse direction y to minimize the tension below the roller members 8a. Breaking of the lower rail 2 with corresponding forces can thereby be prevented.

As further shown, the seat rail pair 1 has a small deformation with vertical loads in the direction of the force F1. A high seat load in the direction of the force F1, for example, in the event of a crash, leads as a result of the selected raised positions of the lower roller member raceways 10a to a lowering of the roller member raceways 10a. A force F2 is perpendicular to a tangential line through the contact point of the support face 46 and the respective roller members 8a. As a result of the small spacing a with respect to a maximum outer support location 26 of the lower rail 2 on a vehicle structure, the resulting torque about this support location 26 is comparatively small. A deflection of the upwardly bent, outer profile portions 22 of the lower rail 2 over a distance b in the transverse direction y outward is correspondingly small. An increased overall stability of the seat rail pair 1 is thereby achieved.

Figure 4:
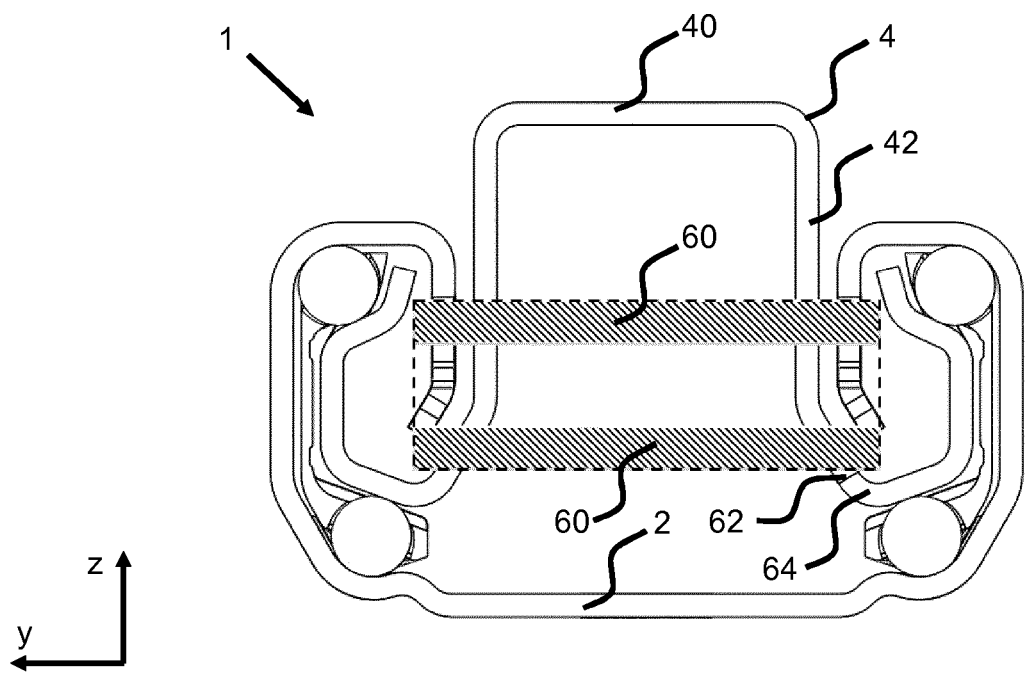
FIG. 4 is another view of the cross-section of the seat rail pair from FIG. 1 in the region of a locking plate.

FIG. 4 shows that a rail longitudinal lock known per se, in this instance a locking plate 60 which can be displaced vertically between a locking position and an unlocking position, may be provided. The locking plate 60 is in this instance guided in a guiding opening of the upper rail 4, in particular in the members 42 of the upper rail 4. A cutting edge 62 which limits the movement of the locking plate 60 in a downward direction is arranged above, in particular outside, a bending radius 64 in the region of the transition of the member 42 into the upwardly bent outer end portion 44. The formation of cracks when the profiles flex about the transverse direction y of the upper rail 4 and lower rail 2 can thereby be prevented.

Figure 5:
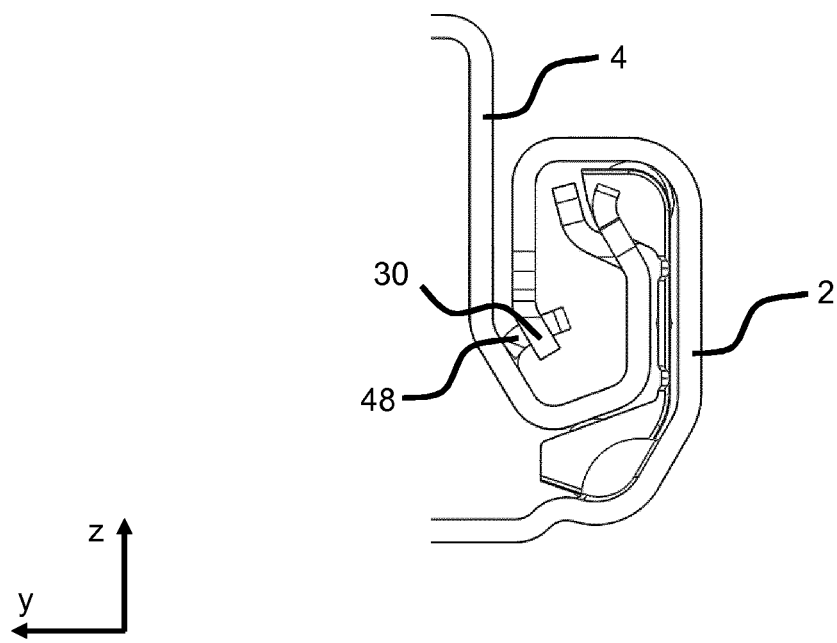
FIG. 5 is a partial cross-sectional view of the seat rail pair from FIG. 1.

FIG. 5 shows that the displaceability of the upper rail 4 relative to the lower rail 2 can be limited by means of a cooperation of an end stop 30 which is formed in extension of the downwardly bent portions 24 of the lower rail 2 with a stop element 48 which is arranged in a transition region between the U-shaped profile 40, 42 and the respective upwardly bent end portion 44. The end stop 30 is in this instance outwardly positioned from the upper rail 4, in particular is bent outward and downward.

Figure 6:
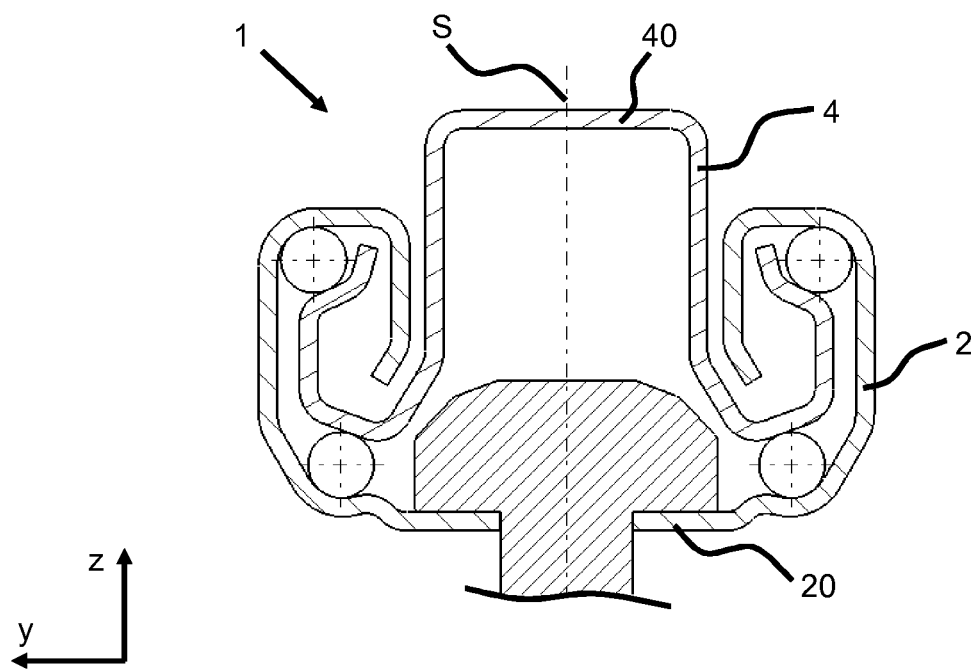
FIG. 6 is another view of the cross-section of the seat rail pair from FIG. 1.

FIG. 6 shows that the illustrated cross-section of the seat rail pair 1 according to the invention provides for a hollow space which is formed by the upper rail 4 and the lower rail 2 and which can be used to receive other mechanisms, for example, an easy-entry memory device, or a more stable fixing element for connection to a vehicle structure, for example, a base connection screw which is illustrated with hatching. The hollow space is of maximum size within the selected outer limit.

The features disclosed in the above description, the claims and the drawings may be significant both individually and in combination for carrying out the invention in the various embodiments thereof.

Although the invention has been described in detail in the drawings and the above illustrations, the illustrations are intended to be understood to be illustrative and exemplary and non-limiting. In particular, the selection of the proportions of the individual elements illustrated in the drawings is not intended to be interpreted to be necessary or limiting. Furthermore, the invention is in particular not limited to the embodiments explained. Other variants of the invention and their construction will be appreciated by the person skilled in the art from the above, disclosure, the Figures and the claims.

Terms used in the claims, such as "comprise", "have", "include", "contain" and the like do not exclude other elements or steps. The use of the indefinite article does not exclude a plural. An individual device can carry out the functions of a plurality of units or devices mentioned in the claims.

While specific embodiments of the invention have been shown and described in detail to illustrate the application of the principles of the invention, it will be understood that the invention may be embodied otherwise without departing from such principles.

What is claimed is:

1. A seat rail pair for a vehicle seat, the seat rail pair comprising:
    a lower rail;
    an upper rail displaceably guided relative to the lower rail in a longitudinal direction, wherein the upper rail and the lower rail mutually engage with each other, wherein the lower rail has a substantially C-shaped profile and downwardly bent end portions, and wherein the upper rail has a substantially U-shaped profile and upwardly bent end portions;
    a plurality of roller members arranged between the upper rail and the lower rail, wherein at least one of the plurality of roller members is arranged in a first lower roller member raceway in a first outer profile portion of the substantially C-shaped profile of the lower rail, wherein at least one of the plurality of roller members is arranged in a second lower roller member raceway in a second outer profile portion of the substantially C-shaped profile of the lower rail, wherein at least one of the plurality of roller members is arranged in a first upper roller member raceway in the first outer profile portion of the substantially C-shaped profile of the lower rail, wherein at least one of the plurality of roller members is arranged in a second upper roller member raceway in the second outer profile portion of the substantially C-shaped profile of the lower rail, wherein each of the upwardly bent end portions of the upper rail defines a planar support face, wherein each of the planar support faces contacts the at least one of the plurality of roller members arranged in a respective one of the first and second lower roller member raceways, and wherein the first and second lower roller member raceways are raised relative to a substantially planar base of the substantially C-shaped profile of the lower rail via steps formed by the first and second outer profile portions of the substantially C-shaped profile of the lower rail; and
    a locking plate adapted to be vertically displaced with respect to the upper and lower rails and extending into the upper rail, wherein longitudinal displaceability of the upper rail relative to the lower rail is limited via a cooperation of an end stop which is arranged in extension of one of the downwardly bent end portions of the lower rail with a stop element which is arranged in a transition region between the substantially U-shaped profile and one of the upwardly bent end portions of the upper rail, wherein the end stop is bent outward and downward, wherein the upper rail has two cutting edges formed therein to limit downward movement of the locking plate, and wherein the two cutting edges are each located above and outside a respective bending radius of the upper rail.

2. The seat rail pair as claimed in claim 1, wherein each of the planar support faces is positioned at an angle in a range from 15° to 25°, with respect to the substantially planar base of the substantially C-shaped profile of the lower rail.

3. The seat rail pair as claimed in claim 1, wherein at least one of the planar support faces is oriented tangentially with respect to a notional circular path about a center point of an outer bend of the substantially U-shaped profile of the upper rail.

4. The seat rail pair as claimed in claim 1, wherein the locking plate is adapted to be vertically displaced between a position that locks the upper rail to the lower rail and a position that unlocks the upper rail with respect to the lower rail.

5. The seat rail pair as claimed in claim 1, wherein the locking plate continuously extends in an uninterrupted fashion through a hollow space created by the upper rail.

6. The seat rail pair as claimed in claim 1, wherein the locking plate abuts the downwardly bent end portions of the lower rail.

7. The seat rail pair as claimed in claim 1, wherein the locking plate extends parallel to a substantially planar base of the substantially U-shaped profile of the upper rail.

8. The seat rail pair as claimed in claim 1, wherein a diameter of the at least one of the plurality of roller members arranged in the first lower roller member raceway is substantially equal to a diameter of the at least one of the plurality roller members arranged in the second lower roller member raceway.

9. The seat rail pair as claimed in claim 1, wherein a diameter of the at least one of the plurality of roller members arranged in the first lower roller member raceway is substantially equal to a diameter of the at least one of the plurality roller members arranged in the first upper roller member raceway.

10. The seat rail pair as claimed in claim 1, wherein a diameter of the at least one of the plurality of roller members arranged in the second lower roller member raceway is substantially equal to a diameter of the at least one of the plurality roller members arranged in the second upper roller member raceway.

11. The seat rail pair as claimed in claim 1, wherein a diameter of the at least one of the plurality of roller members arranged in the first upper roller member raceway is substantially equal to a diameter of the at least one of the plurality roller members arranged in the second upper roller member raceway.

12. The seat rail pair as claimed in claim 1, wherein at least one of the plurality of roller members has a diameter in a range from 4 mm to 6 mm.

13. The seat rail pair as claimed in claim 1, further comprising:

a plurality of roller member cages, wherein each of the plurality of roller member cages includes an upper retention portion and a lower retention portion, and wherein each of the plurality of roller members is retained in a respective one of the upper and lower retention portions of a respective one of the plurality of roller member cages.

14. The seat rail pair as claimed in claim 1, wherein the first and second outer profile portions of the substantially C-shaped profile of the lower rail are upwardly bent outer profile portions, wherein the substantially planar base has a plurality of sides each adjoined by a respective one of the upwardly bent outer profile portions, wherein each of the upwardly bent outer profile portions merges, opposite the substantially planar base, into a respective one of the downwardly bent end portions.

15. The seat rail pair as claimed in claim 14, wherein the upwardly bent end portions of the upper rail are guided in a space defined between the upwardly bent outer profile portions of the lower rail.

16. The seat rail pair as claimed in claim 1, wherein the upper rail is constructed symmetrically with respect to an axis of symmetry.

17. The seat rail pair as claimed in claim 16, wherein the upper rail has twelve bends with a maximum bending angle of 90°.

18. The seat rail pair as claimed in claim 1, wherein the lower rail is constructed symmetrically with respect to an axis of symmetry.

19. The seat rail pair as claimed in claim 18, wherein the lower rail has fourteen bends with a maximum bending angle of 90°.

* * * * *